United States Patent
Miyata et al.

(10) Patent No.: US 11,526,319 B2
(45) Date of Patent: Dec. 13, 2022

(54) PRINTING MANAGEMENT APPARATUS AND NON-TRANSITORY COMPUTER READABLE MEDIUM STORING PRINTING MANAGEMENT PROGRAM

(71) Applicant: FUJIFILM Business Innovation Corp., Tokyo (JP)

(72) Inventors: Kenji Miyata, Kanagawa (JP); Takashi Morimura, Kanagawa (JP); Takuma Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/858,079

(22) Filed: Jul. 6, 2022

(65) Prior Publication Data

US 2022/0342622 A1 Oct. 27, 2022

Related U.S. Application Data

(62) Division of application No. 16/927,996, filed on Jul. 14, 2020, now Pat. No. 11,422,763.

(30) Foreign Application Priority Data

Mar. 16, 2020 (JP) .............................. JP2020-045804

(51) Int. Cl.
*G06F 3/12* (2006.01)
*H04N 1/00* (2006.01)

(52) U.S. Cl.
CPC ....... *G06F 3/1296* (2013.01); *H04N 1/00477* (2013.01)

(58) Field of Classification Search
CPC .... G06F 3/1219; G06F 3/1255; G06F 3/1296; G06F 3/1232; G06F 3/1203; H04N 1/00477; G06K 15/1823
See application file for complete search history.

(56) References Cited

U.S. PATENT DOCUMENTS

2005/0270565 A1* 12/2005 Shima ................ H04N 1/32523
358/1.15
2018/0113655 A1* 4/2018 Sawata ................. G06F 3/1258

* cited by examiner

*Primary Examiner* — Iriana Cruz
(74) *Attorney, Agent, or Firm* — JCIPRNET

(57) ABSTRACT

A printing management apparatus includes a processor configured to acquire an order quantity being a quantity of paper required for printing, acquire a stock quantity for each attribute of paper, the stock quantity being a quantity of paper having at least one or more attributes in common with attributes of the paper which is required for the printing and is in stock by a printer, and, when the order quantity is greater than the stock quantity and a sum of at least two stock quantities is equal to or greater than the order quantity, display the printer as a printer capable of accepting an order.

9 Claims, 15 Drawing Sheets

LST11

| | | | PRINTER PG1 | | | | |
|---|---|---|---|---|---|---|---|
| OPTION | FORM | METHOD OF STANDARDIZATION | MANUFACTURER X | | MANUFACTURER Y | | SUM OF NUMBER OF SHEETS OF PAPER |
| | | | PAPER A | PAPER B | PAPER A | PAPER B | |
| 1 | ADD STOCK QUANTITY | STANDARDIZATION AS PAPER A | 100 | 0 | 200 | 0 | 300 |
| 2 | ADD STOCK QUANTITY | STANDARDIZATION AS PAPER B | 0 | 200 | 0 | 100 | 300 |
| 3 | ADD STOCK QUANTITY | STANDARDIZATION AS MANUFACTURER X | 100 | 200 | 0 | 0 | 300 |
| 4 | ADD STOCK QUANTITY | STANDARDIZATION AS MANUFACTURER Y | 0 | 0 | 200 | 100 | 300 |

NUMBER OF SHEETS OF PAPER                    UNIT: SHEET

| MANUFACTURER NAME OF PAPER | TYPE OF PAPER | ORDER QUANTITY (SHEETS) |
|---|---|---|
| STANDARDIZED MANUFACTURER | STANDARDIZED TYPE | 300 |

ORDER INFORMATION

FIG. 4

ZDB

| | NAME OF PRINTER, TYPE OF PAPER, STOCK QUANTITY (SHEETS) | | | |
|---|---|---|---|---|
| MANUFACTURER NAME OF PAPER | PRINTER PG1 | | PRINTER PG2 | |
| | PAPER A | PAPER B | PAPER A | PAPER B |
| MANUFACTURER X | 100 | 200 | 200 | 100 |
| MANUFACTURER Y | 200 | 100 | 100 | 200 |

STOCK DATABASE

FIG. 11

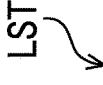
LST1

| OPTION | FORM | MANUFACTURER | PRINTER PG1 | | PRINTER PG2 | | SUM OF NUMBER OF SHEETS OF PAPER |
|---|---|---|---|---|---|---|---|
| | | | STANDARDIZATION AS PAPER A | STANDARDIZATION AS PAPER B | STANDARDIZATION AS PAPER A | STANDARDIZATION AS PAPER B | |
| 1 | ADD STOCK QUANTITY | STANDARDIZATION AS MANUFACTURER X | 100+(200) | | ←(200) | | 300 |
| 2 | ADD STOCK QUANTITY | STANDARDIZATION AS MANUFACTURER X | | 200+(100) | | ←(100) | 300 |
| 3 | ADD STOCK QUANTITY | STANDARDIZATION AS MANUFACTURER Y | 200+(100) | | ←(100) | | 300 |
| 4 | ADD STOCK QUANTITY | STANDARDIZATION AS MANUFACTURER Y | | 100+(200) | | ←(200) | 300 |
| 5 | ADD STOCK QUANTITY | STANDARDIZATION AS MANUFACTURER X | (100) | | ←(100)+200 | | 300 |
| 6 | ADD STOCK QUANTITY | STANDARDIZATION AS MANUFACTURER X | | (200) | | ←(200)+100 | 300 |
| 7 | ADD STOCK QUANTITY | STANDARDIZATION AS MANUFACTURER Y | (200) | | ←(200)+100 | | 300 |
| 8 | ADD STOCK QUANTITY | STANDARDIZATION AS MANUFACTURER Y | | (100) | | ←(100)+200 | 300 |
| 9 | DIVIDE ORDER QUANTITY | STANDARDIZATION AS MANUFACTURER X | 100 | | 200 | | 300 |
| 10 | DIVIDE ORDER QUANTITY | STANDARDIZATION AS MANUFACTURER X | | 200 | | 100 | 300 |
| 11 | DIVIDE ORDER QUANTITY | STANDARDIZATION AS MANUFACTURER Y | 200 | | 100 | | 300 |
| 12 | DIVIDE ORDER QUANTITY | STANDARDIZATION AS MANUFACTURER Y | | 100 | | 200 | 300 |

NUMBER OF SHEETS OF PAPER    UNIT: SHEET

FIG. 12

LST2

| OPTION | FORM | PRINTER PG1 | | PRINTER PG2 | | SUM OF COSTS FOR PAPER |
|---|---|---|---|---|---|---|
| | | PAPER A | PAPER B | PAPER A | PAPER B | |
| 1 | ADD STOCK QUANTITY | 1,500 | | | | 1,500 |
| 2 | ADD STOCK QUANTITY | | 900 | | | 900 |
| 3 | ADD STOCK QUANTITY | 1,500 | | | | 1,500 |
| 4 | ADD STOCK QUANTITY | | 900 | | | 900 |
| 5 | ADD STOCK QUANTITY | | | 1,500 | | 1,500 |
| 6 | ADD STOCK QUANTITY | | | | 900 | 900 |
| 7 | ADD STOCK QUANTITY | | | 1,500 | | 1,500 |
| 8 | ADD STOCK QUANTITY | | | | 900 | 900 |
| 9 | DIVIDE ORDER QUANTITY | 500 | | 1,000 | | 1,500 |
| 10 | DIVIDE ORDER QUANTITY | | 600 | | 300 | 900 |
| 11 | DIVIDE ORDER QUANTITY | 1,000 | | 500 | | 1,500 |
| 12 | DIVIDE ORDER QUANTITY | | 300 | | 600 | 900 |
| | | 5 YEN/SHEET | 3 YEN/SHEET | 5 YEN/SHEET | 3 YEN/SHEET | UNIT: YEN |

COST FOR PAPER

FIG. 13

LST3

| OPTION | FORM | PRINTER PG1 | | PRINTER PG2 | | SUM OF COSTS FOR PRINTING |
|---|---|---|---|---|---|---|
| | | PAPER A | PAPER B | PAPER A | PAPER B | |
| 1 | ADD STOCK QUANTITY | 6,000 | | | | 6,000 |
| 2 | ADD STOCK QUANTITY | | 6,300 | | | 6,300 |
| 3 | ADD STOCK QUANTITY | 6,000 | | | | 6,000 |
| 4 | ADD STOCK QUANTITY | | 6,300 | | | 6,300 |
| 5 | ADD STOCK QUANTITY | | | 6,900 | | 6,900 |
| 6 | ADD STOCK QUANTITY | | | | 6,600 | 6,600 |
| 7 | ADD STOCK QUANTITY | | | 6,900 | | 6,900 |
| 8 | ADD STOCK QUANTITY | | | | 6,600 | 6,600 |
| 9 | DIVIDE ORDER QUANTITY | 2,000 | | 4,600 | | 6,600 |
| 10 | DIVIDE ORDER QUANTITY | | 4,200 | | 2,200 | 6,400 |
| 11 | DIVIDE ORDER QUANTITY | 2,000 | | 4,600 | | 6,600 |
| 12 | DIVIDE ORDER QUANTITY | | 4,200 | | 2,200 | 6,400 |
| | | 20 YEN/SHEET | 21 YEN/SHEET | 23 YEN/SHEET | 22 YEN/SHEET | UNIT: YEN |

COST FOR PRINTING

FIG. 14

LST4

| OPTION | FORM | PRINTER PG1 | | PRINTER PG2 | | SUM OF COSTS FOR SHIPMENT |
|---|---|---|---|---|---|---|
| | | PAPER A | PAPER B | PAPER A | PAPER B | |
| 1 | ADD STOCK QUANTITY | 3,000 | | | | 3,000 |
| 2 | ADD STOCK QUANTITY | | 3,000 | | | 3,000 |
| 3 | ADD STOCK QUANTITY | 3,000 | | | | 3,000 |
| 4 | ADD STOCK QUANTITY | | 3,000 | | | 3,000 |
| 5 | ADD STOCK QUANTITY | | | 2,400 | | 2,400 |
| 6 | ADD STOCK QUANTITY | | | | 2,400 | 2,400 |
| 7 | ADD STOCK QUANTITY | | | 2,400 | | 2,400 |
| 8 | ADD STOCK QUANTITY | | | | 2,400 | 2,400 |
| 9 | DIVIDE ORDER QUANTITY | 1,000 | | 1,600 | | 2,600 |
| 10 | DIVIDE ORDER QUANTITY | | 2,000 | | 800 | 2,800 |
| 11 | DIVIDE ORDER QUANTITY | 2,000 | | 800 | | 2,800 |
| 12 | DIVIDE ORDER QUANTITY | | 1,000 | | 1,600 | 2,600 |
| | | 10 YEN/SHEET | 10 YEN/SHEET | 8 YEN/SHEET | 8 YEN/SHEET | UNIT: YEN |

COST FOR SHIPMENT

FIG. 15

LST5

| OPTION | FORM | TOTAL | DELIVERY AVAILABLE TIME |
|---|---|---|---|
| 1 | ADD STOCK QUANTITY | 10,500 | NOVEMBER 5, 2019 |
| 2 | ADD STOCK QUANTITY | 10,200 | NOVEMBER 8, 2019 |
| 3 | ADD STOCK QUANTITY | 10,500 | NOVEMBER 7, 2019 |
| 4 | ADD STOCK QUANTITY | 10,200 | NOVEMBER 1, 2019 |
| 5 | ADD STOCK QUANTITY | 10,800 | NOVEMBER 11, 2019 |
| 6 | ADD STOCK QUANTITY | 9,900 | NOVEMBER 11, 2019 |
| 7 | ADD STOCK QUANTITY | 10,800 | NOVEMBER 7, 2019 |
| 8 | ADD STOCK QUANTITY | 9,900 | NOVEMBER 1, 2019 |
| 9 | DIVIDE ORDER QUANTITY | 10,700 | NOVEMBER 12, 2019 |
| 10 | DIVIDE ORDER QUANTITY | 10,100 | NOVEMBER 5, 2019 |
| 11 | DIVIDE ORDER QUANTITY | 10,900 | NOVEMBER 13, 2019 |
| 12 | DIVIDE ORDER QUANTITY | 9,900 | NOVEMBER 8, 2019 |

UNIT: YEN
TOTAL COST

FIG. 16

LST11

PRINTER PG1

| OPTION | FORM | METHOD OF STANDARDIZATION | MANUFACTURER X | | MANUFACTURER Y | | SUM OF NUMBER OF SHEETS OF PAPER |
|---|---|---|---|---|---|---|---|
| | | | PAPER A | PAPER B | PAPER A | PAPER B | |
| 1 | ADD STOCK QUANTITY | STANDARDIZATION AS PAPER A | 100 | 0 | 200 | 0 | 300 |
| 2 | ADD STOCK QUANTITY | STANDARDIZATION AS PAPER B | 0 | 200 | 0 | 100 | 300 |
| 3 | ADD STOCK QUANTITY | STANDARDIZATION AS MANUFACTURER X | 100 | 200 | 0 | 0 | 300 |
| 4 | ADD STOCK QUANTITY | STANDARDIZATION AS MANUFACTURER Y | 0 | 0 | 200 | 100 | 300 |

NUMBER OF SHEETS OF PAPER           UNIT: SHEET

FIG. 17

LST12

| PRINTER PG1 | | |
|---|---|---|
| OPTION | FORM | SUM OF COST FOR PAPER |
| 1 | ADD STOCK QUANTITY | 1,500 |
| 2 | ADD STOCK QUANTITY | 900 |
| 3 | ADD STOCK QUANTITY | 1,100 |
| 4 | ADD STOCK QUANTITY | 1,300 |

PAPER A: 5 YEN/SHEET
PAPER B: 3 YEN/SHEET

UNIT: YEN

COST FOR PAPER

FIG. 18

LST13

| PRINTER PG1 | | |
|---|---|---|
| OPTION | FORM | SUM OF COST FOR PRINTING |
| 1 | ADD STOCK QUANTITY | 6,000 |
| 2 | ADD STOCK QUANTITY | 6,300 |
| 3 | ADD STOCK QUANTITY | 6,200 |
| 4 | ADD STOCK QUANTITY | 6,100 |

PAPER A: 20 YEN/SHEET
PAPER B: 21 YEN/SHEET

UNIT: YEN

COST FOR PRINTING

FIG. 19

LST14

| | PRINTER PG1 | |
|---|---|---|
| OPTION | FORM | SUM OF COST FOR SHIPMENT |
| 1 | ADD STOCK QUANTITY | 3,000 |
| 2 | ADD STOCK QUANTITY | 3,000 |
| 3 | ADD STOCK QUANTITY | 3,000 |
| 4 | ADD STOCK QUANTITY | 3,000 |

10 YEN/SHEET　　　　　　　　UNIT: YEN

COST FOR SHIPMENT

FIG. 20

LST15

| | PRINTER PG1 | | |
|---|---|---|---|
| OPTION | FORM | TOTAL | DELIVERY AVAILABLE TIME |
| 1 | ADD STOCK QUANTITY | 10,500 | NOVEMBER 6, 2019 |
| 2 | ADD STOCK QUANTITY | 10,200 | NOVEMBER 5, 2019 |
| 3 | ADD STOCK QUANTITY | 10,300 | NOVEMBER 7, 2019 |
| 4 | ADD STOCK QUANTITY | 10,400 | NOVEMBER 6, 2019 |

UNIT: YEN

TOTAL COST

PRINTING MANAGEMENT APPARATUS AND NON-TRANSITORY COMPUTER READABLE MEDIUM STORING PRINTING MANAGEMENT PROGRAM

CROSS-REFERENCE TO RELATED APPLICATIONS

This application is a divisional application of U.S. application Ser. No. 16/927,996 filed on Jul. 14, 2020, which claims priority under 35 USC 119 from Japanese Patent Application No. 2020-045804 filed Mar. 16, 2020. The entirety of each of the above-mentioned patent applications is hereby incorporated by reference herein and made a part of this specification.

BACKGROUND

(i) Technical Field

The present invention relates to a printing management apparatus and a non-transitory computer readable medium storing a printing management program.

(ii) Related Art

JP2002-297973A discloses a printing process resource operation management system in which a server is joined to a temporary ordering side terminal and an application side terminal via a communication network. The printing process resource operation management system disclosed in JP2002-297973A includes a reception spool information storage unit that stores temporary order information and application information, and a temporary order information storage unit that stores the temporary order information. The server includes a temporary order registration unit, an application registration unit, a temporary order collation unit, a temporary order collation list display unit, and a temporary order selection unit.

The temporary order registration unit causes the temporary order information acquired from the temporary ordering side terminal to be stored in the temporary order information storage unit. The application registration unit causes the application information acquired from the application side terminal to be stored in the reception spool information storage unit. The temporary order collation unit collates the temporary order information in the temporary order information storage unit with the application information in the reception spool information storage unit. Then, the temporary order collation unit associates the collated coincident temporary order information with the corresponding application information, and stores the resultant of the association in the reception spool information storage unit. The temporary order collation list display unit causes a list of temporary order information stored in the reception spool information storage unit in association with the application information to be displayed on the application side terminal. The temporary order selection unit selects the corresponding temporary order information from the temporary order collation list displayed on the application side terminal, based on selection information acquired from the application side terminal, and sets the selected temporary order information as order acceptance information.

SUMMARY

When an orderer places an order for printing on paper, and the quantity of ordered paper exceeds the quantity of paper in stock by each of a plurality of printers, there is a problem that acceptance of an order by any printer is not possible.

Aspects of non-limiting embodiments of the present disclosure relate to a printing management apparatus and a non-transitory computer readable medium storing a printing management program that, even when the quantity of paper required for printing ordered by an orderer exceeds the quantity of paper in stock by each of a plurality of printers, it is possible that any printer accepts the order.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing management apparatus that includes a processor configured to acquire an order quantity being a quantity of paper required for printing, acquire a stock quantity for each attribute of paper, the stock quantity being a quantity of paper having at least one or more attributes in common with attributes of the paper which is required for the printing and is in stock by a printer, and, when the order quantity is greater than the stock quantity and a sum of at least two stock quantities is equal to or greater than the order quantity, display the printer as a printer capable of accepting an order.

BRIEF DESCRIPTION OF THE DRAWINGS

Exemplary embodiment(s) of the present invention will be described in detail based on the following figures, wherein:

FIG. 3 illustrates the contents of order information HJ in Exemplary Embodiment 1;

FIG. 4 illustrates the contents of a stock database ZDB in Exemplary Embodiment 1;

FIG. 11 illustrates a list LST1 created by adding stock quantities and dividing an order quantity in Exemplary Embodiment 1;

FIG. 12 illustrates a list LST2 created by adding the stock quantities and dividing the order quantity in Exemplary Embodiment 1;

FIG. 13 illustrates a list LST3 created by adding the stock quantities and dividing the order quantity in Exemplary Embodiment 1;

FIG. 14 illustrates a list LST4 created by adding the stock quantities and dividing the order quantity in Exemplary Embodiment 1;

FIG. 15 illustrates a list LST5 created by adding the stock quantities and dividing the order quantity in Exemplary Embodiment 1;

FIG. 16 illustrates a list LST11 created by adding stock quantities according to Exemplary Embodiment 2;

FIG. 17 illustrates a list LST12 created by adding the stock quantities in Exemplary Embodiment 2;

FIG. 18 illustrates a list LST13 created by adding the stock quantities in Exemplary Embodiment 2;

FIG. 19 illustrates a list LST14 created by adding the stock quantities in Exemplary Embodiment 2; and FIG. 20 illustrates a list LST15 created by adding the stock quantities in Exemplary Embodiment 2.

DETAILED DESCRIPTION

Exemplary Embodiment 1

Hereinafter, a printing management system including a printing management apparatus according to Exemplary Embodiment 1 of the present invention will be described.

Configuration of Exemplary Embodiment 1

Configuration of Printing Management System PKS

Figure 1:
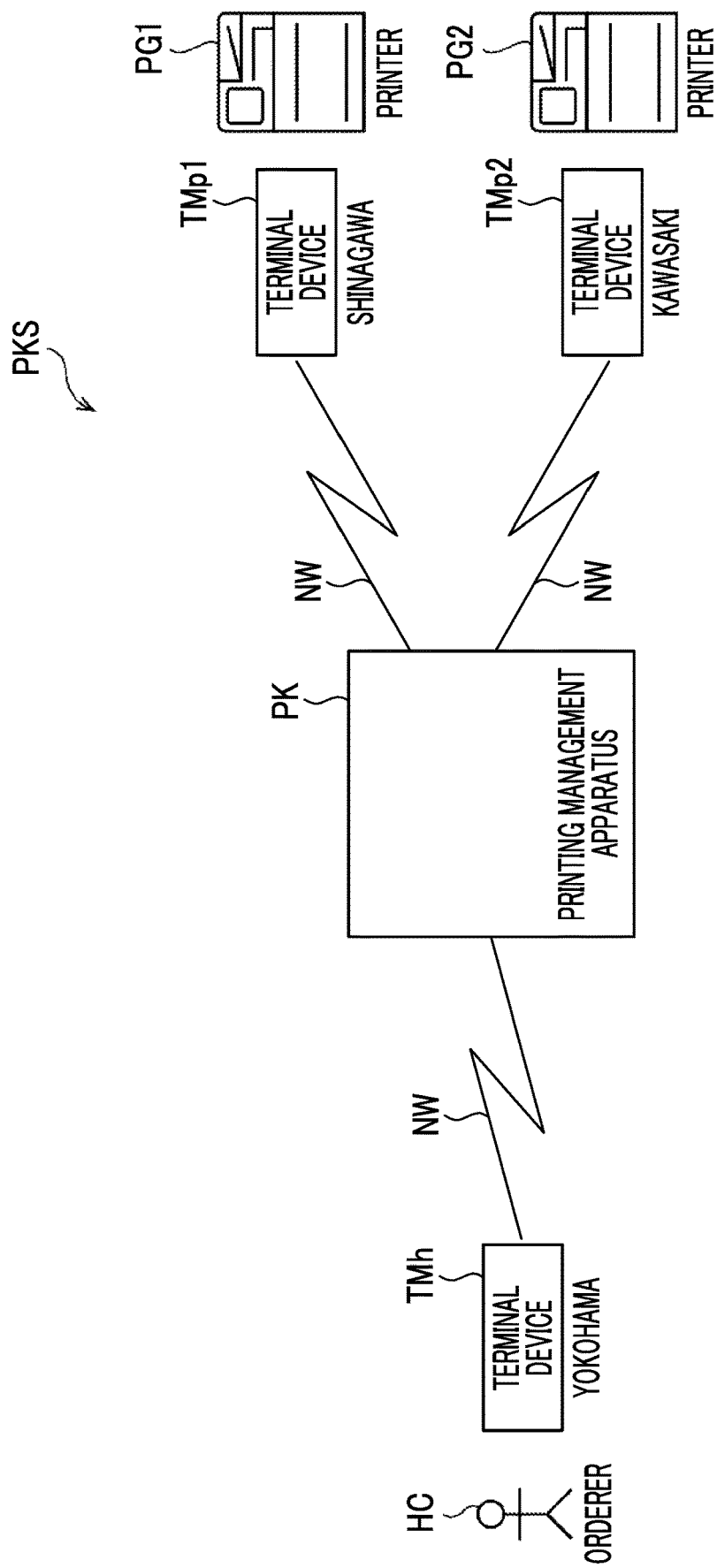
FIG. 1 illustrates a configuration of a printing management system PKS according to Exemplary Embodiment 1.

FIG. 1 illustrates a configuration of a printing management system PKS according to Exemplary Embodiment 1. The configuration of the printing management system PKS in Exemplary Embodiment 1 will be described below with reference to FIG. 1.

As illustrated in FIG. 1, in Exemplary Embodiment 1, the printing management system PKS includes a printing management apparatus PK, a terminal device TMh, a terminal device TMp1, and a terminal device TMp2. The printing management apparatus PK, the terminal device TMh, the terminal device TMp1, and the terminal device TMp2 are mutually connected by a network NW (for example, the Internet) as illustrated in FIG. 1.

Configuration of Printing Management Apparatus PK

Figure 2:
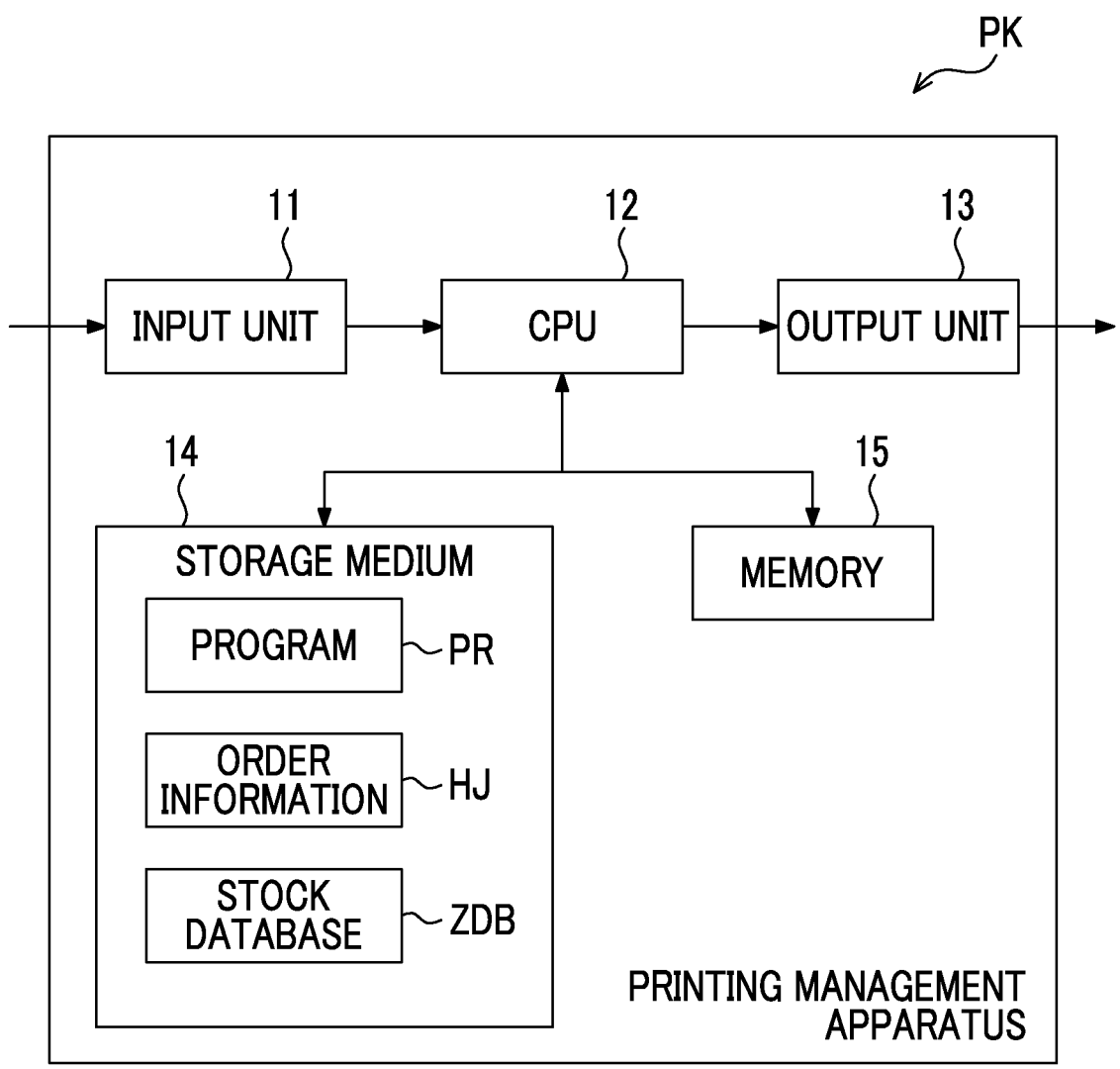
FIG. 2 illustrates a configuration of a printing management apparatus PK in Exemplary Embodiment 1.

FIG. 2 illustrates the configuration of the printing management apparatus PK in Exemplary Embodiment 1.

As illustrated in FIG. 2, in Exemplary Embodiment 1, the printing management apparatus PK includes an input unit 11, a Central Processing Unit (CPU) 12, an output unit 13, a storage medium 14, and a memory 15.

The input unit 11 includes, for example, a keyboard, a mouse, a touch panel, and a network unit. The CPU 12 is an example of a processor, and is the core of a well-known computer that operates hardware in accordance with software. The output unit 13 includes, for example, a printer, a liquid crystal monitor, a touch panel, and a network unit. The storage medium 14 includes, for example, a hard disk drive (HDD), a solid state drive (SSD), and a Read Only Memory (ROM). The memory 15 includes, for example, a Dynamic Random Access Memory (DRAM) and a Static Random Access Memory (SRAM).

The storage medium 14 stores a program PR, order information HJ, and a stock database ZDB, as illustrated in FIG. 2.

The program PR refers to a group of commands for defining the contents of processing to be performed by the printing management apparatus PK.

FIG. 3 illustrates the contents of order information HJ in Exemplary Embodiment 1.

In Exemplary Embodiment 1, the order information HJ indicates the contents of an order placed by, for example, an orderer HC (illustrated in FIG. 1) working in Yokohama toward, for example, a printer PG1 having a factory in Shinagawa and a printer PG2 having a factory in Kawasaki (illustrated in FIG. 1) through the printing management apparatus PK. Specifically, the order refers to printing on paper having two or more types of attributes. As illustrated in FIG. 3, the order information HJ includes "manufacturer name of paper", "type of paper", and "order quantity (sheets)". The order information HJ indicates, for example, "standardized manufacturer" as the manufacturer name of paper, "standardized type" as the type of paper, and "300" as the order quantity (sheets).

Here, "manufacturer name of paper" (an example of a paper brand) and "type of paper" are examples of "attributes of paper". Here, the brand of paper includes information as a product of the paper, for example, the product name or the model number of the paper and the manufacturer. The type of paper includes information regarding paper size such as A4, B5, and 58 mm width, and paper quality of paper such as coated paper and high-quality paper. The "attributes of paper" may include, for example, the printers PG1 and PG2, and the printing factories (not illustrated) of the printers PG1 and PG2. The "paper" includes, for example, cut paper and roll paper. The "sheet" of the "order quantity (sheets)" is an example of a unit of paper, and may be, for example, the weight and the quantity.

The "standardized manufacturer" as the manufacturer name of paper means, for example, that, when two companies such as the manufacturers X and Y, that manufacture paper are provided, any of a case using only paper manufactured by the manufacturer X and a case using only paper manufactured by the manufacturer Y is performed.

The "standardized type" as the type of paper means, for example, that, when two types of paper such as paper A and paper B are provided, any of a case using only the paper A and a case using only the paper B is performed.

FIG. 4 illustrates the contents of the stock database ZDB in Exemplary Embodiment 1. In Exemplary Embodiment 1, the stock database ZDB indicates the contents of paper in stock by the printer PG1 and the printer PG2. As illustrated in FIG. 4, the stock database ZDB includes "printer name", "type of paper", "stock quantity (sheets)", and "manufacturer name of paper". The stock database ZDB indicates that, for example, the "printer PG1" as the name of a printer has "paper A" (as the type of paper) of the "manufacturer X" as the manufacturer name of the paper, by "100 sheets" as the stock quantity.

As illustrated in FIG. 1, the contents of the stock database ZDB are transmitted from the respective terminal devices TMp1 and TMp2 used by the printers PG1 and PG2 to the printing management apparatus PK via the network NW.

Figure 5:
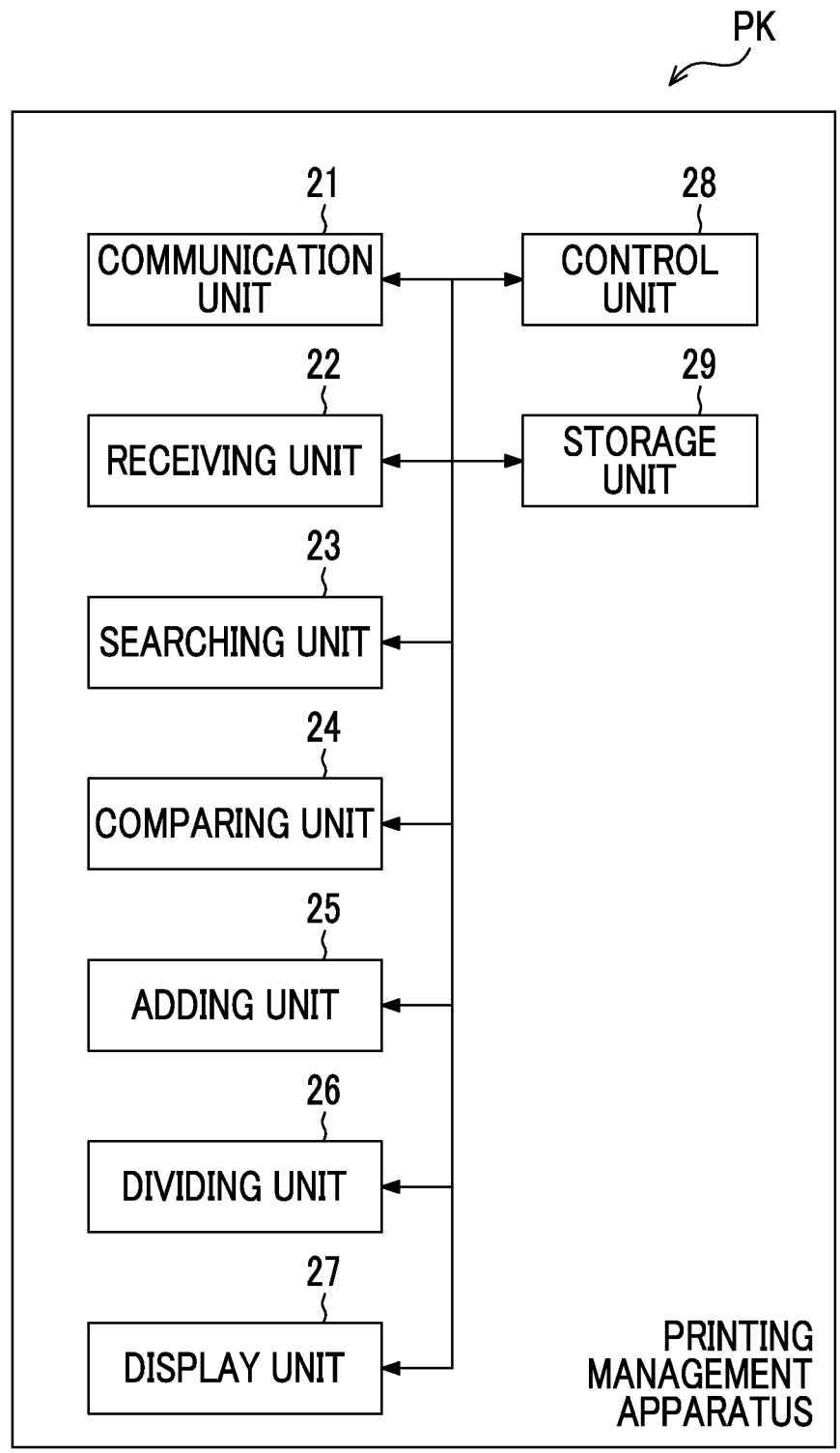
FIG. 5 is a functional block diagram illustrating the printing management apparatus PK in Exemplary Embodiment 1.

FIG. 5 is a functional block diagram illustrating the printing management apparatus PK in Exemplary Embodiment 1.

As illustrated in FIG. 2, the printing management apparatus PK includes a communication unit 21, a receiving unit 22, a searching unit 23, a comparing unit 24, an adding unit 25, a dividing unit 26, a display unit 27, a control unit 28, and a storage unit 29.

Regarding the relationship between the hardware configuration and the functional configuration of the printing management apparatus PK, on the hardware, the CPU 12 executes a program PR stored in the storage medium 14 (which realizes a part of the function of the storage unit 29) using the memory 15 (which realizes another part of the function of the storage unit 29), and, as necessary, the CPU 12 controls the operations of the input unit 11 and the output unit 13 as the control unit 28, and thereby the functions of the communication unit 21, the receiving unit 22, the searching unit 23, the comparing unit 24, the adding unit 25, the dividing unit 26, and the display unit 27 are realized. The function of each unit will be described later.

Configuration of Terminal Device TMh of Orderer HS

Figure 6:
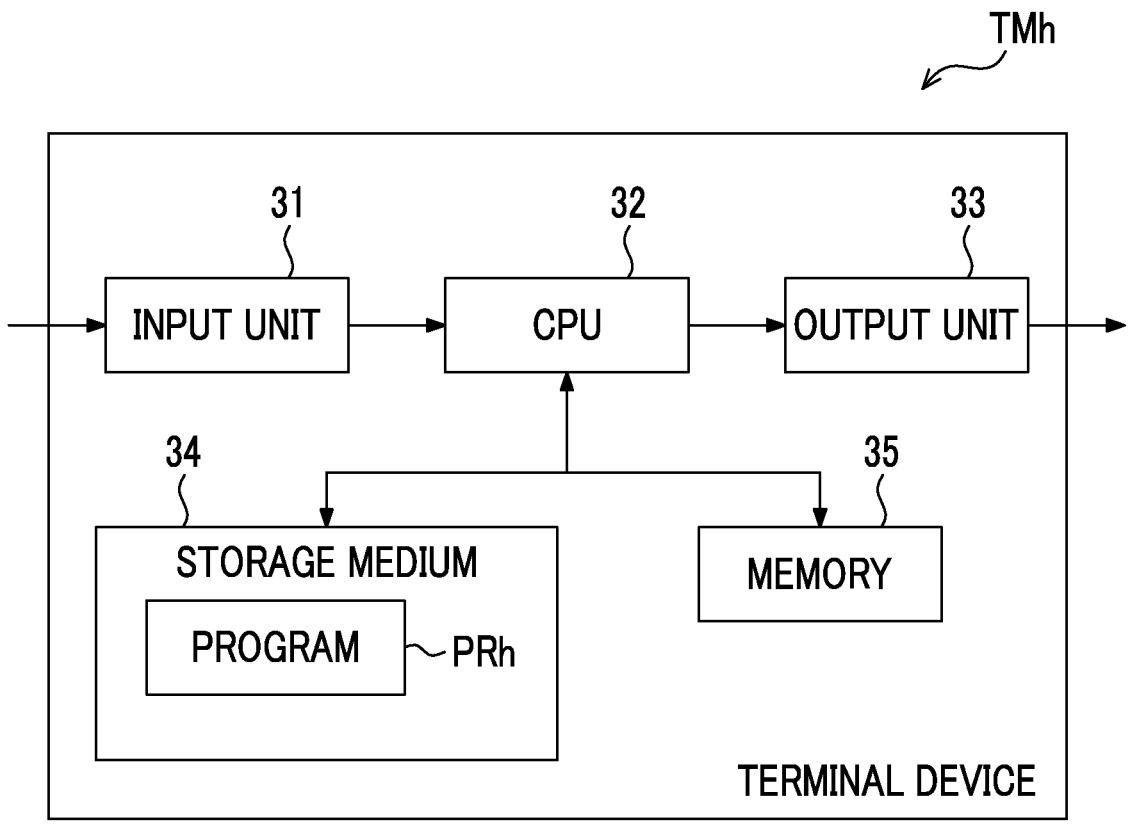
FIG. 6 illustrates a configuration of a terminal device TMh used by an orderer HC in Exemplary Embodiment 1.

FIG. 6 illustrates the configuration of the terminal device TMh used by an orderer HC in Exemplary Embodiment 1.

As illustrated in FIG. 6, the terminal device TMh includes an input unit 31, a Central Processing Unit (CPU) 32, an output unit 33, a storage medium 34, and a memory 35, similar to the printing management apparatus PK (illustrated in FIG. 1).

Similar to the input unit 11 in the printing management apparatus PK, the input unit 31 includes, for example, a keyboard, a mouse, a touch panel, and a network unit.

Similar to the CPU 12 in the printing management apparatus PK, the CPU 32 is an example of a processor, and is the core of a well-known computer that operates hardware in accordance with software.

Similar to the output unit 13 in the printing management apparatus PK, the output unit 33 includes, for example, a printer, a liquid crystal monitor, a touch panel, and a network unit.

Similar to the storage medium 14 in the printing management apparatus PK, the storage medium 34 includes, for example, a hard disk drive (HDD), a solid state drive (SSD), and a Read Only Memory (ROM).

Similar to the memory 15 in the printing management apparatus PK, the memory 35 includes, for example, a Dynamic Random Access Memory (DRAM) and a Static Random Access Memory (SRAM).

As illustrated in FIG. 6, the storage medium 34 stores a program PRh.

The program PRh refers to a group of commands for defining the contents of processing to be performed by the terminal device TMh.

Figure 7:
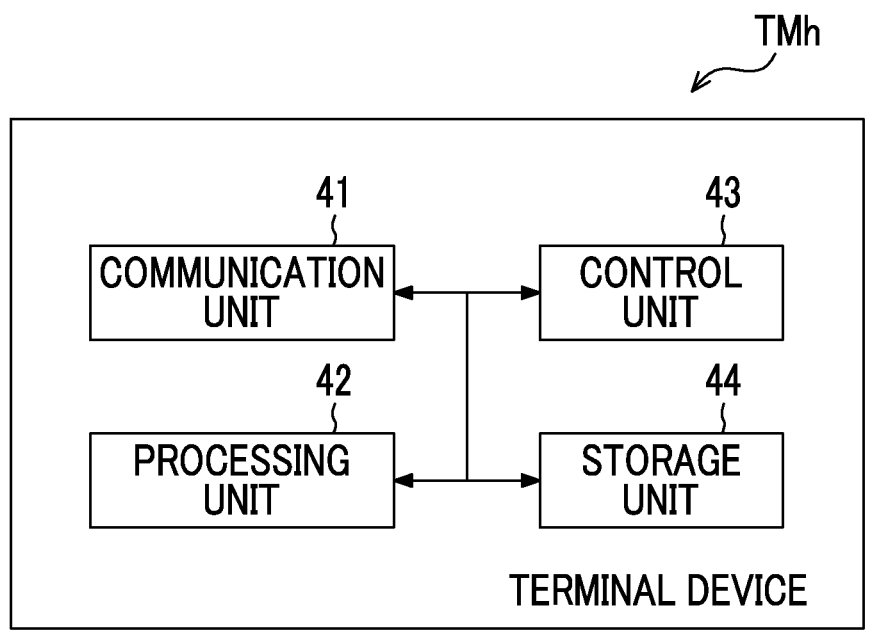
FIG. 7 is a functional block diagram illustrating the terminal device TMh used by the orderer HC in Exemplary Embodiment 1.

FIG. 7 is a functional block diagram illustrating the terminal device TMh used by the orderer HC in Exemplary Embodiment 1.

As illustrated in FIG. 7, in Exemplary Embodiment 1, the terminal device TMh includes a communication unit 41, a processing unit 42, a control unit 43, and a storage unit 44.

Regarding the relationship between the hardware configuration and the functional configuration of the terminal device TMh, on the hardware, the CPU 32 executes a program PRh stored in the storage medium 34 (which realizes a part of the function of the storage unit 44) using the memory 35 (which realizes another part of the function of the storage unit 44), and, as necessary, the CPU 32 controls the operations of the input unit 31 and the output unit 33 as the control unit 43, and thereby the functions of the communication unit 41 and the processing unit 42 are realized. The function of each unit will be described later.

Configuration of Terminal Devices TMp1 and TMp2 of Printers PG1 and PG2

Figure 8:
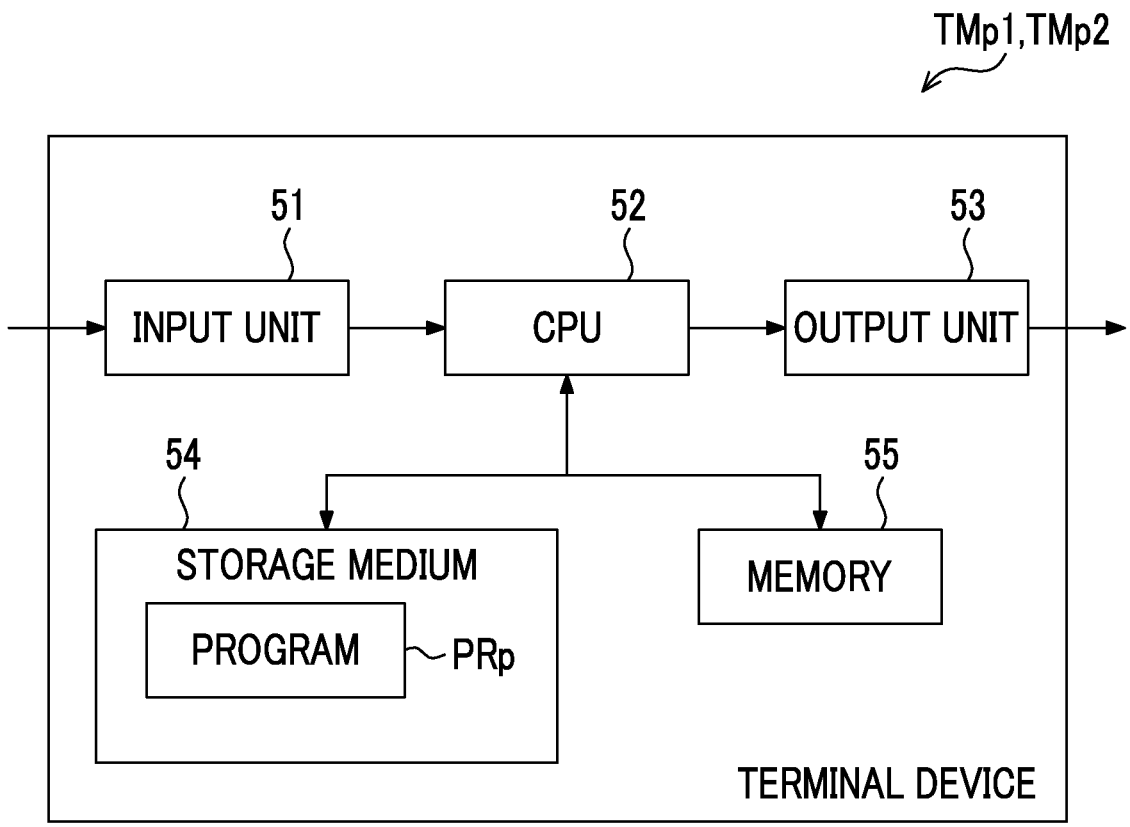
FIG. 8 illustrates configurations of terminal devices TMp1 and TMp2 used by printers PG1 and PG2 in Exemplary Embodiment 1.

FIG. 8 illustrates the configurations of the terminal devices TMp1 and TMp2 used by printers PG1 and PG2 in Exemplary Embodiment 1.

As illustrated in FIG. 8, similar to the terminal device TMh (illustrated in FIG. 6), each of the terminal devices TMp1 and TMp2 includes an input unit 51, a Central Processing Unit (CPU) 52, an output unit 53, a storage medium 54, and a memory 55.

Similar to the input unit 31 in the terminal device TMh, the input unit 51 includes, for example, a keyboard, a mouse, a touch panel, and a network unit.

Similar to the CPU 32 in the terminal device TMh, the CPU 52 is an example of a processor, and is the core of a well-known computer that operates hardware in accordance with software.

Similar to the output unit 33 in the terminal device TMh, the output unit 53 includes, for example, a printer, a liquid crystal monitor, a touch panel, and a network unit.

Similar to the storage medium 34 in the terminal device TMh, the storage medium 54 includes, for example, a hard disk drive (HDD), a solid state drive (SSD), and a Read Only Memory (ROM).

Similar to the memory 35 in the terminal device TMh, the memory 55 includes, for example, a Dynamic Random. Access Memory (DRAM) and a Static Random Access Memory (SRAM).

As illustrated in FIG. 8, the storage medium 54 stores a program PRp.

The program PRp refers to a group of commands for defining the contents of processing to be performed by the terminal devices TMp1 and TMp2.

Figure 9:
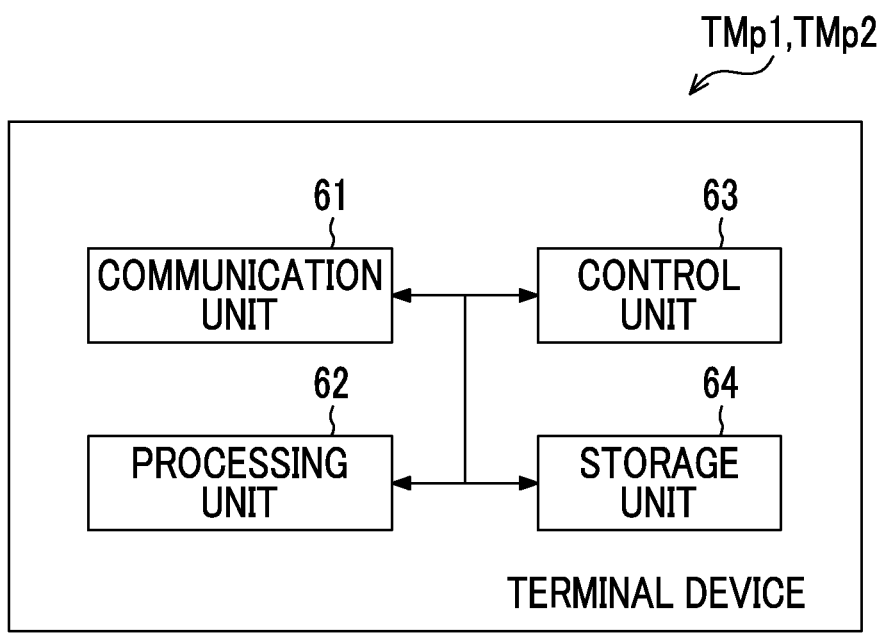
FIG. 9 is a functional block diagram illustrating the terminal devices TMp1 and TMp2 used by the printers PG1 and PG2 in Exemplary Embodiment 1.

FIG. 9 is a functional block diagram illustrating the terminal devices TMp1 and TMp2 used by the printers PG1 and PG2 in Exemplary Embodiment 1.

As illustrated in FIG. 9, in Exemplary Embodiment 1, the terminal device TMh includes a communication unit 61, a processing unit 62, a control unit 63, and a storage unit 64, similar to the terminal device TMh (illustrated in FIG. 7).

Regarding the relationship between the hardware configuration and the functional configuration in the terminal devices TMp1 and TMp2, on the hardware, the CPU 52 executes the program PRp stored in the storage medium 54 (which realizes a part of the function of the storage unit 64) using the memory 55 (which realizes another part of the function of the storage unit 64), and, as necessary, the CPU 52 controls the operations of the input unit 51 and the output unit 53 as the control unit 63, and thereby the functions of the communication unit 61 and the processing unit 62 are realized. The function of each unit will be described later.

Operation in Exemplary Embodiment 1

Figure 10:
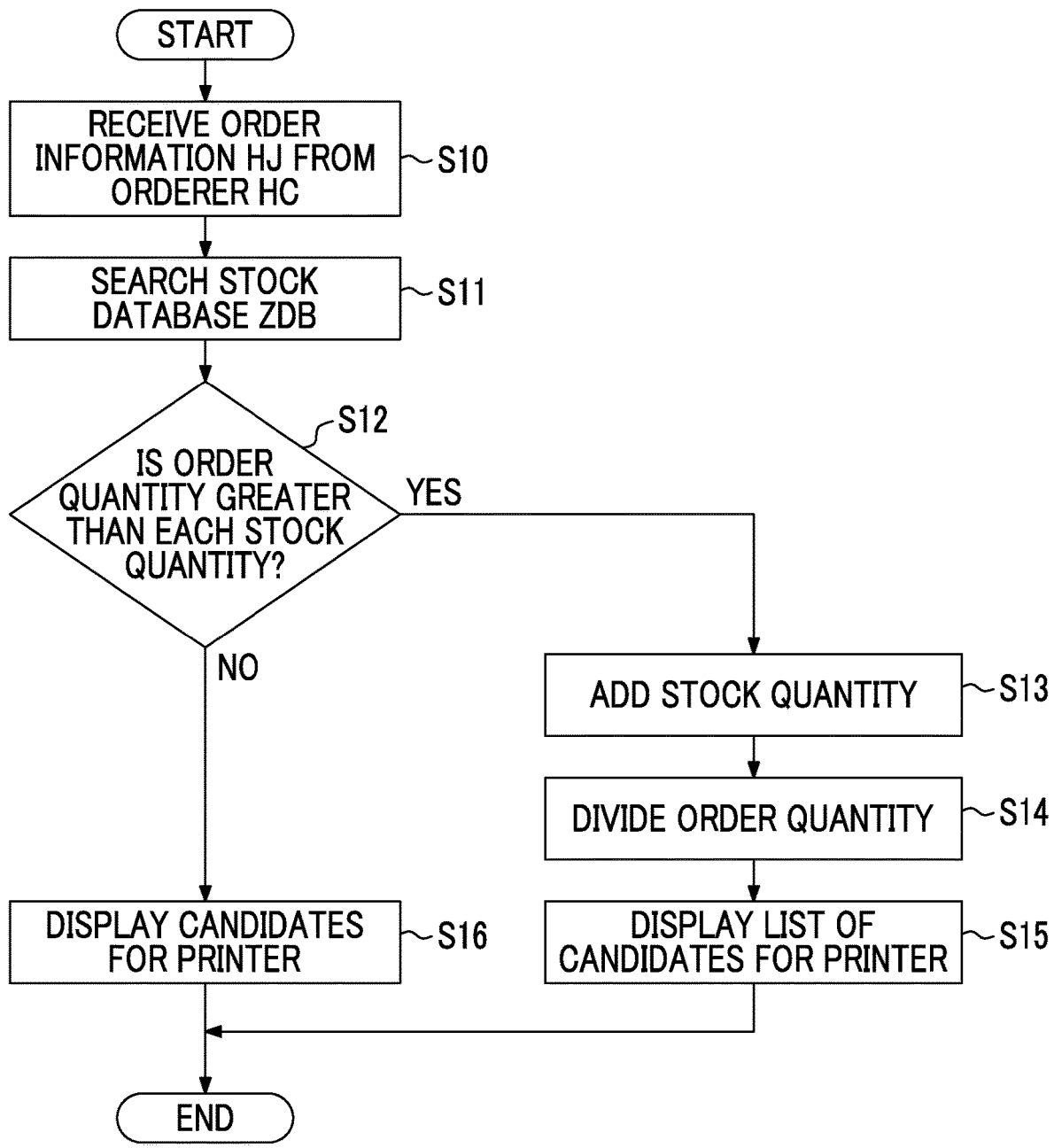
FIG. 10 is a flowchart illustrating an operation of the printing management system PKS in Exemplary Embodiment 1.

FIG. 10 is a flowchart illustrating the operation of the printing management system PKS in Exemplary Embodiment 1. The operation of the printing management system PKS in Exemplary Embodiment 1 will be described below with reference to the flowchart of FIG. 10.

For ease of description and understanding, it is assumed that the printing management apparatus PK has previously received the contents of the stock database ZDB (illustrated in FIG. 4) from the terminal devices TMp1 and TMp2 of the printers PG1 and PG2, and stores the received contents in the storage medium 14.

Step S10: The orderer HC (illustrated in FIG. 1) uses the terminal device TMh (illustrated in FIG. 1) to transmit order information HJ (illustrated in FIG. 3) to the printing management apparatus PK via the network NW. More specifically, in the terminal device TMh, the CPU 32 (illustrated in FIG. 6) as the communication unit 41 (illustrated in FIG. 7) transmits the order information HJ. On the other side, in the printing management apparatus PK, the CPU 12 (illustrated in FIG. 2) as the communication unit and the receiving unit 22 (illustrated in FIG. 5) receives and accepts the order information HJ. In the printing management apparatus PK, the CPU 12 stores the accepted order information HJ in the storage medium 14 (illustrated in FIG. 2).

Step S11: In a case where the order information HJ is accepted in Step S10, in the printing management apparatus PK, the CPU 12 as the searching unit 23 (illustrated in FIG. 5) searches the stock database ZDB stored in advance in the storage medium 14, based on the accepted order information HJ.

More specifically, the CPU 12 searches the stock database ZDB based on the order information HJ indicating the "standardized manufacturer" as the manufacturer name of paper, the "standardized type" as the type of paper, and "300" as the order quantity (sheets), which are illustrated in FIG. 2. Thus, as illustrated in FIG. 4 and as described above, the CPU 12 recognizes that, for example, the "printer PG1" as the printer name has "paper A" (as the type of paper) of the "manufacturer X" as the manufacturer name of the paper, by "100 sheets" as the stock quantity, relating to the order information HJ. The CPU 12 recognizes the stock quantity for other manufacturer names of paper, other types of paper, and other printer names, in the similar manner.

When the order information HJ indicates, for example, "paper B" (not illustrated) as the type of paper instead of the "standardized type" (illustrated in FIG. 3) as the type of paper, as illustrated in FIG. 4, the CPU 12 acquires information indicating that the "printer PG1" as the printer name has "200 sheets" of paper of the "manufacturer X" and "100 sheets" of paper of the "manufacturer Y" regarding "paper B" which is identical to the "paper B" in the order information HJ.

Step S12: In a case where the stock database ZDB is searched and the stock quantity is recognized in Step S11, in the printing management apparatus PK, the CPU 12 as the comparing unit 24 (illustrated in FIG. 5) compares whether or not "300 sheets" being the order quantity in the order information HJ is greater (larger) than the stock quantity in the stock database ZDB.

Here, "300 sheets" as the order quantity in the order information HJ is greater (larger) than the stock quantity in the stock database ZDB in all cases: (1) a case of the "printer PG1" as the printer name, the "manufacturer X" as the manufacturer name of paper, the "paper A" as the type of paper, and "100 sheets" as the stock quantity; (2) a case of the "printer PG1" as the printer name, the "manufacturer X" as the manufacturer name of paper, the "paper B" as the type of paper, and "200 sheets" as the stock quantity; . . . ; (7) a case of the "printer PG2" as the printer name, the "manufacturer Y" as the manufacturer name of paper, the "paper A" as the type of paper, and "100 sheets" as the stock quantity; and (8) a case of the "printer PG2" as the printer name, the "manufacturer Y" as the manufacturer name of paper, the "paper B" as the type of paper, and "200 sheets" as the stock quantity. Thus, the process proceeds to "YES".

On the contrary, when the order quantity in the order information HJ is equal to or smaller than (equal to or smaller than) any of the stock quantities in the stock database ZDB, the process proceeds to "NO" and Step S16.

Step S13: In a case where it is determined in Step S12 that "300 sheets" as the order quantity in the order information HJ is greater (larger) than all of (1) "100 sheets", (2) "200 sheets", . . . , (7) "100 sheets", and (8) "200 sheets" as the stock quantities in the stock database ZDB, in the printing management apparatus PK, the CPU 12 performs addition.

More specifically, the CPU 12 as the adding unit 25 (illustrated in FIG. 5) adds two or more of (1) "100 sheets", (2) "200 sheets", . . . , (7) "100 sheets", and (8) "200 sheets" as the stock quantities in the stock database ZDB (illustrated in FIG. 4) and thus sets the sum of the stock quantities to be equal to or more than the order quantity. The CPU 12 creates an overall list (described later) by adding the stock quantities. The details of adding the stock quantity will be described later together with the division (described later) of the order quantity.

Step S14: In a case where two or more of (1) "100 sheets", (2) "200 sheets", . . . , (7) "100 sheets", and (8) "200 sheets" as the stock quantities in the stock database ZDB are added in Step S13, in the printing management apparatus PK, the CPU 12 performs division. More specifically, the CPU 12 as the dividing unit 26 (illustrated in FIG. 5) divides "300 sheets" being the order quantity in the order information HJ into two or more parts such that the parts are equal to or smaller than any of the stock quantities. The CPU 12 creates an overall list (described later) by dividing the order quantity, similar to the above-described addition of the stock quantity.

Addition of Stock Quantity, Division of Order Quantity, and Details of Overall List FIGS. 11 to 15 illustrate lists LST1 to LST5, which form an overall list created by adding the stock quantities and dividing the order quantity in Exemplary Embodiment 1, respectively.

In the lists LST1 to LST5, as illustrated in FIGS. 11 to 15, option numbers, that is, "Option 1" to "Option 12" are commonly used. For example, "Option 1" in the list LST1 (illustrated in FIG. 11) and "Option 1" in the list LST2 (illustrated in FIG. 12) mean the identical option.

The overall list created by the CPU 12 in a manner of adding the stock quantities in Step S13 and dividing the order quantity in Step S14 includes the list LST1 (illustrated in FIG. 11), the list LST2 (illustrated in FIG. 12), the list LST3 (illustrated in FIG. 13), the list LST4 (illustrated in FIG. 14), and the list LST5 (illustrated in FIG. 15).

The list LST1 (illustrated in FIG. 11) refers to information regarding "the number of sheets of paper".

The list LST2 (illustrated in FIG. 12) refers to information regarding "cost for paper".

The list LST3 (illustrated in FIG. 13) refers to information regarding "cost for printing".

The list LST4 (illustrated in FIG. 14) refers to information regarding "cost for shipment".

The list LST5 (illustrated in FIG. 15) refers to information regarding the total (total cost) of the "cost for paper" to the "cost for shipment" described above.

Here, "cost for paper", "cost for printing", and "cost for shipment" are examples of "cost related to ordering".

Number of Sheets of Paper

In FIG. 11, parentheses "( )" indicate a movement source of paper and a movement destination of the paper. Further, in FIG. 11, an arrow "→" indicates the direction in which the paper is moved from the movement source to the movement destination.

In FIG. 11, regarding the addition of the stock quantity in Step S13, in the printing management apparatus PK, the CPU 12 creates, for example, "Option 1" based on the attribute of the paper, that is, based on the "standardized manufacturer" as the manufacturer name of paper and the "standardized type" as the type of paper in the order information HJ (illustrated in FIG. 3). In "Option 1", as illustrated in FIG. 11, "paper A" of the "manufacturer X" is concentrated on one "printer PG1" under the "standardization as the manufacturer X" as the manufacturer name of paper and the "standardization as paper A" as the type of paper. That is, the "printer PG1" is a candidate to which the order of the order information HJ is to be assigned.

In "Option 1", more specifically, the "printer PG1" possesses "100 sheets" of "paper A" of the "manufacturer X" as it is in stock by the printer PG1, and "200 sheets" of the "paper A" of the manufacturer X" in stock by the printer PG2 are moved from the printer PG2 to the printer PG1. Thus, the "printer PG1" possesses the "paper A" of the "manufacturer X" by "300 sheets" (=100 sheets+200 sheets). In summary, "Option 1" means that an order of "300 sheets" is assigned to the "printer PG1" being one printer.

The CPU 12 creates "Option 2" to "Option 8" in the similar manner to "Option 1".

Meanwhile, in FIG. 11, regarding the division of the order quantity in Step S14, the CPU 12 creates, for example, "Option 9" based on the attribute of the paper, that is, based on the "standardized manufacturer" as the manufacturer name of paper and the "standardized type" as the type of paper in the order information HJ (illustrated in FIG. 3). In "Option 9", as illustrated in FIG. 11, "300 sheets" being the order quantity is divided into the "printer PG1" and the "printer PG2" being two printers, under the "standardization as the manufacturer X" as the manufacturer name of paper and the "standardization as paper A" as the type of paper. That is, the "printer PG1" and the "printer PG2" are candidates to which the order of the order information HJ is to be assigned.

More specifically, in "Option 9", "100 sheets" of "300 sheets" being the order quantity are assigned to the "printer PG1" to correspond to "100 sheets" being the stock quantity of the "paper A" of the "manufacturer X", which is in stock by the "printer PG1". "200 sheets" of "300 sheets" being the order quantity are assigned to the "printer PG2" to correspond to "200 sheets" being the stock quantity of the "paper A" of the "manufacturer X", which is in stock by the "printer PG2".

The CPU 12 creates "Option 10" to "Option 12" in the similar manner to "Option 9".

Cost for Paper

As illustrated in FIG. 12, regarding the cost for paper, it is assumed that the "paper A" is "5 yen/sheet" and the "paper B" is "3 yen/sheet".

Regarding the addition of the stock quantity in Step S13, for example, for "Option 1", the CPU 12 calculates the cost for "300 sheets" of the "paper A" used in "Option 1" to be "1500 yen" (=5 yen/sheet×300 sheets).

The CPU 12 calculates the cost for paper for "Option 2" to "Option 8" in the similar manner to that in "Option 1".

Regarding the division of the order quantity in Step S14, for example, for "Option 9", the CPU 12 calculates that the cost for "100 sheets" of the "paper A" of the "printer PG1" is "500 yen" (5 yen/sheet×100 sheets), the cost for "200 sheets" of the "paper A" of the "printer PG2" is "1000 yen" (5 yen/sheet×200 sheets), and the total paper cost for the "paper A" is "1500 yen" (500 yen+1000 yen), in the similar manner to that in "Option 1".

The CPU 12 calculates the cost for paper for "Option 10" to "Option 12" in the similar manner to that in "Option 9".

Cost for Printing

As illustrated in FIG. 13, regarding the cost for printing, it is assumed that printing on the "paper A" by the "printer PG1" is "20 yen/sheet". It is assumed that the printing on the "paper B" by the "printer PG1" is "21 yen/sheet. It is assumed that the printing on the "paper A" by the "printer PG2" is "23 yen/sheet. It is assumed that the printing on the "paper B" by the "printer PG2" is "22 yen/sheet.

Regarding the addition of the stock quantity in Step S13, for example, for "Option 1", the CPU 12 calculates the total of the printing cost for "300 sheets" of the "paper A" used in "Option 1" to be "6000 yen" (=20 yen/sheet×300 sheets).

The CPU 12 calculates the cost for printing for "Option 2" to "Option 8" in the similar manner to that in "Option 1".

Regarding the division of the order quantity in Step S14, for example, for "Option 9", the CPU 12 calculates that the cost of printing for "100 sheets" of the "paper A" of the "printer PG1" is "2000 yen" (20 yen/sheet×100 sheets), the cost of printing for "200 sheets" of the "paper A" of the "printer PG2" is "4600 yen" (23 yen/sheet×200 sheets), and the total of the printing cost for the "paper A" is "6600 yen" (2000 yen+4600 yen), in the similar manner to that in "Option 1".

The CPU 12 calculates the cost for printing for "Option 10" to "Option 12" in the similar manner to that in "Option 9".

Cost for Shipment

As illustrated in FIG. 14, regarding the cost for shipment, it is assumed that the cost for shipment from the "printer PG1" to the "orderer HC" is "10 yen/sheet" regardless of whether the type of paper is the "paper A" or the "paper B". In addition, it is assumed that the cost for shipment from the "printer PG2" to the "orderer HC" is "8 yen/sheet" regardless of whether the type of paper is the "paper A" or the "paper B".

Regarding the addition of the stock quantity in Step S13, for example, for "Option 1", the CPU 12 calculates the cost for shipment of "300 sheets" of the "paper A" of the "printer PG1", which is used in "Option 1" to be "3000 yen" (=10 yen/sheet×300 sheets).

The CPU 12 calculates the cost for shipment for "Option 2" to "Option 8" in the similar manner to that in "Option 1".

Regarding the division of the order quantity in Step S14, for example, for "Option 9", the CPU 12 calculates that the cost for shipment of "100 sheets" of the "paper A" of the "printer PG1" is "1000 yen" (10 yen/sheet×100 sheets), the cost for shipment of "200 sheets" of the "paper A" of the "printer PG2" is "1600 yen" (8 yen/sheet×200 sheets), and the total of the shipment cost for the "paper A" is "2600 yen" (1000 yen+1600 yen), in the similar manner to that in "Option 1".

The CPU 12 calculates the cost for shipment for "Option 10" to "Option 12" in the similar manner to that in "Option 9".

Total Cost

As illustrated in FIG. 15, regarding the addition of the stock quantities in Step S13, for example, the CPU 12 calculates the total cost (total) of "Option 1" to be "10500 yen" (=1500 yen+6000 yen+3000 yen).

The CPU 12 calculates the total cost for "Option 2" to "Option 8" in the similar manner to that in "Option 1".

Regarding the division of the order quantity in Step S14, for example, for "Option 9", the CPU 12 calculates the total cost (total) of "Option 9" to be "10700 yen" (=1500 yen+6600 yen+2600 yen), in the similar manner to "Option 1".

The CPU 12 calculates the cost for shipment for "Option 10" to "Option 12" in the similar manner to that in "Option 9".

In the printing management apparatus PK, the CPU 12 as the communication unit 21 and the receiving unit 22 transmits an inquiry of "delivery available times" of "Option 1" to "Option 12" to the communication unit 61 and the processing unit 62 in the terminal devices TMp1 and TMp2.

Thus, the CPU 12 obtains responses regarding the "delivery available times" of "Option 1" to "Option 12" and needs the delivery available time" to be displayed at a position adjacent to the "total" field in the list LST 5 (illustrated in FIG. 15), for example.

Returning to FIG. 10, the description of the operation of the printing management system PKS in Exemplary Embodiment 1 will be continued.

Step S15: In a case where "300 sheets" being the order quantity are divided in Step S14, the CPU 12 as the display unit 27 (illustrated in FIG. 5) displays the overall list (illustrated in FIGS. 11 to 15) on the output unit 13, in other words, displays the overall list in a list.

"List display" is an example of "list display".

Step S16: When the order quantity is not greater (not larger) than any of the stock quantities in Step S12, in other words, when all of the stock quantities are greater (larger) than the order quantity, the CPU 12 as the display unit 27 displays the printer name (not illustrated) having a stock quantity (for example, 400 sheets) which is greater than the order quantity (for example, 300 sheets), on the output unit 13 as a candidate for the printer having a possibility of the order of the order information HJ being assigned to the printer.

In response to the overall list (illustrated in FIGS. 11 to 15) displayed on the output unit 13 in the printing management apparatus PK, the orderer HC selects "Option 1" from the input unit 11 in the printing management apparatus PK, for example. In other words, the CPU 12 in the printing management apparatus PK, as the receiving unit 22, receives the selection of "Option 1". In this case, the CPU 12 as the communication unit 21 notifies the terminal device TMp1 of the printer PG1 that the printer PG1 is to receive "200 sheets" of the "paper A" of the "manufacturer X" from the "printer PG2" and that the printer PG1 is allowed to obtain the order of "300 sheets" in the order information HJ by "100 sheets" of the "paper A" of the "manufacturer X", which are possessed by the "printer PG1" and "200 sheets" of the "paper A" of the "manufacturer X", which are received from the "printer PG2". In addition, the CPU 12 notifies the terminal device TMp2 of the printer PG2 that "200 sheets" of the "paper A" of the "manufacturer X" of the "printer PG2" are to be taken over to the "printer PG1".

Addition of Stock Quantity and Selective Execution of Order Quantity

Instead of performing both the addition of the stock quantity in Step S13 and the division of the order quantity in Step S14 described above, only one of the addition and the division may be selectively performed.

Exemplary Embodiment 2

A printing management system including a printing management apparatus according to Exemplary Embodiment 2 of the present invention will be described below.

Configuration of Exemplary Embodiment 2

Configuration of Printing Management System PKS

A printing management system PKS in Exemplary Embodiment 2 basically has a configuration similar to the configuration of the printing management system PKS in Exemplary Embodiment 1 (illustrated in FIG. 1).

In Exemplary Embodiment 2, differing from Exemplary Embodiment 1, the printer PG2 and the terminal device TMp2 are not provided. In other words, in Exemplary Embodiment 2, regarding the printer and the terminal device used by the printer, only the printer PG1 and the terminal device TMp1 are provided.

Configurations of Printing Management Apparatus PK, Terminal Device TMh, and Terminal Device TMp1

A printing management apparatus PK, a terminal device TMh, and a terminal device TMp1 in Exemplary Embodiment 2 have the configurations and functions of the printing management apparatus PK, the terminal device TMh, and the terminal device TMp1 (illustrated in FIG. 2 and FIGS. 5 to 9) in Exemplary Embodiment 1.

In the printing management system PKS in Exemplary Embodiment 2, differing from the printing management apparatus PK in Exemplary Embodiment 1, the printing management apparatus PK in the Exemplary Embodiment 2 creates an overall list including lists LST11 to LST15 (illustrated in FIGS. 16 to 20) instead of the overall list including the lists LST1 to LST5 (illustrated in FIGS. 11 to 15).

Operation in Exemplary Embodiment 2

The operation of the printing management system PKS in Exemplary Embodiment 2 is basically similar to the operation of the printing management system PKS in Exemplary Embodiment 1. The operation of the printing management system PKS in Exemplary Embodiment 2 will be described below with reference to the flowchart (illustrated in FIG. 10) in Exemplary Embodiment 1.

Step S11: Similar to Exemplary Embodiment 1, in a case where the order information HJ is accepted in Step S10, in the printing management apparatus PK, the CPU 12 (illustrated in FIG. 2) as the searching unit 23 (illustrated in FIG. 5) searches the stock database ZDB stored in advance in the storage medium 14, based on order information HJ.

More specifically, the CPU 12 recognizes that, for example, the "printer PG1" as the printer name has "paper A" (as the type of paper) of the "manufacturer X" as the manufacturer name of the paper, by "100 sheets" as the stock quantity, relating to the order information HJ. In the similar manner to the above description, the CPU 12 recognizes the stock quantity for other manufacturer names of paper and other types of paper, for the "printer PG1" as the printer name.

Here, differing from Exemplary Embodiment 1, the printer PG2 and the terminal device TMp2 are not provided, and therefore, information regarding the "manufacturer name of paper" and the "type of paper" for the "printer PG2" is not included in the stock database ZDB. Therefore, the CPU does not recognize the stock quantity of the printer "printer PG2".

Step S12: In a case where the stock database ZDB is searched and the stock quantity of the "printer PG1" is recognized in Step S11, in the printing management apparatus PK, the CPU 12 as the comparing unit 24 (illustrated in FIG. 5) compares whether or not "300 sheets" being the order quantity in the order information HJ is greater (larger) than the stock quantity of the "printer PG1" in the stock database ZDB.

Here, "300 sheets" being the order quantity in the order information HJ is greater (larger) than the stock quantity in the stock database ZDB in all cases: (1) a case of the "printer PG1" as the printer name, the "manufacturer X" as the manufacturer name of paper, the "paper A" as the type of paper, and "100 sheets" as the stock quantity; (2) a case of the "printer PG1" as the printer name, the "manufacturer X" as the manufacturer name of paper, the "paper B" as the type of paper, and "200 sheets" as the stock quantity; (4) a case of the "printer PG1" as the printer name, the "manufacturer Y" as the manufacturer name of paper, the "paper A" as the type of paper, and "200 sheets" as the stock quantity; and (8) a case of the "printer PG1" as the printer name, the "manufacturer Y" as the manufacturer name of paper, the "paper B" as the type of paper, and "100 sheets" as the stock quantity. Thus, the process proceeds to "YES".

On the contrary, when the order quantity in the order information HJ is equal to or smaller than (equal to or smaller than) any of the stock quantities in the stock database ZDB, the process proceeds to "NO" and Step S16.

Step S13: In a case where it is determined in Step S12 that "300 sheets" as the order quantity in the order information HJ is greater (larger) than all of the four stock quantities of the printer PG1" in the stock database ZDB, in the printing management apparatus PK, the CPU 12 as the adding unit 25 (illustrated in FIG. 5) adds two or more of the four stock quantities of the "printer PG1" being the printer in the stock database ZDB (illustrated in FIG. 4).

Addition of Stock Quantity and Details of Overall List

FIGS. 16 to 20 illustrate lists LST11 to LST15, which form an overall list created by adding the stock quantities in Exemplary Embodiment 2, respectively.

Similar to Exemplary Embodiment 1, as illustrated in FIGS. 16 to 20, in the lists LST11 to LST15, option numbers, that is, "Option 1" to "Option 4" are commonly used. For example, "Option 1" in the list LST11 (illustrated in FIG. 16) and "Option 1" in the list LST12 (illustrated in FIG. 17) mean the identical option.

The list LST11 (illustrated in FIG. 16) refers to information regarding "the number of sheets of paper".

The list LST12 (illustrated in FIG. 17) refers to information regarding "cost for paper".

The list LST13 (illustrated in FIG. 18) refers to information regarding "cost for printing".

The list LST14 (illustrated in FIG. 19) refers to information regarding "cost for shipment".

The list LST15 (illustrated in FIG. 20) refers to information regarding the total (total cost) of the "cost for paper" to the "cost for shipment" described above.

Number of Sheets of Paper

In FIG. 16, regarding the addition of the stock quantity in Step S13, in the printing management apparatus PK, the CPU 12 creates, for example, "Option 1" based on the attribute of the paper, that is, based on the "standardized type" as the type of paper in the order information HJ (illustrated in FIG. 3) such that the "attributes" are identical to each other. In "Option 1", as illustrated in FIG. 16, "100 sheets" of the "paper A" of the "manufacturer X" and "200 sheets" of the "paper A" of the "manufacturer Y" are added in the "printer PG1" under the "standardization as the paper A" as the type of paper. Thus, the "printer PG1" may obtain an order of "300 sheets" being the order quantity in the order information HJ, by "300 sheets" of the "paper A", which has been obtained by the addition. In other words, the "printer PG1" is a candidate to which the order of the order information HJ is to be assigned.

The CPU 12 creates "Option 2" to "Option 4" in the similar manner to "Option 1".

Cost for Paper

As illustrated in FIG. 17, similar to Exemplary Embodiment 1, regarding the cost for paper, it is assumed that the "paper A" is "5 yen/sheet" and the "paper B" is "3 yen/sheet".

Regarding the addition of the stock quantity in Step S13, for example, for "Option 1", the CPU 12 calculates the cost for "300 sheets" of the "paper A" used in "Option 1" to be "1500 yen" (=5 yen/sheet×300 sheets).

The CPU 12 calculates the cost for paper for "Option 2" to "Option 4" in the similar manner to that in "Option 1".

Cost for Printing

As illustrated in FIG. 18, similar to Exemplary Embodiment 1, regarding the cost for printing, it is assumed that printing on the "paper A" by the "printer PG1" is "20 yen/sheet" and printing on the "paper B" by the "printer PG1" is "21 yen/sheet".

Regarding the addition of the stock quantity in Step S13, for example, for "Option 1", the CPU 12 calculates the total of the printing cost for "300 sheets" of the "paper A" used in "Option 1" to be "6000 yen" (=20 yen/sheet×300 sheets).

The CPU 12 calculates the cost for printing for "Option 2" to "Option 4" in the similar manner to that in "Option 1".

Cost for Shipment

As illustrated in FIG. 19, similar to Exemplary Embodiment 1, regarding the cost for shipment, it is assumed that the cost for shipment from the "printer PG1" to the "orderer HC" is "10 yen/sheet" regardless of whether the type of paper is the "paper A" or the "paper B".

Regarding the addition of the stock quantity in Step S13, for example, for "Option 1", the CPU 12 calculates the cost for shipment of "300 sheets" of the "paper A" of the "printer PG1", which is used in "Option 1" to be "3000 yen" (=10 yen/sheet×300 sheets).

The CPU 12 calculates the cost for shipment for "Option 2" to "Option 4" in the similar manner to that in "Option 1".

Total Cost

As illustrated in FIG. 20, regarding the total cost, similar to Exemplary Embodiment 1, the CPU 12 calculates, for example, the total cost (total) of "Option 1" to be "10500 yen" (=1500 yen+6000 yen+3000 yen).

The CPU 12 calculates the total cost for "Option 2" to "Option 4" in the similar manner to that in "Option 1".

Similar to Exemplary Embodiment 1, it is necessary that the CPU 12 displays the "delivery available time" at a position adjacent to the "total" field in the list LST15 (illustrated in FIG. 20).

Step S15: In a case where the process proceeds to Step S15 without the division of the order quantity in Step S14, the CPU 12 as the display unit 27 (illustrated in FIG. 5) displays the overall list (illustrated in FIGS. 16 to 20) on the output unit 13, in other words, displays the overall list in a list.

Step S16: When the order quantity is not greater (not larger) than any of the four stock quantities of the printer PG1 in Step S12, in other words, when all of the four stock quantities of the printer PG1 are greater (larger) than the order quantity, the CPU 12 as the display unit 27 displays the printer PG1 having a stock quantity (for example, 400 sheets) which is greater than the order quantity (for example, 300 sheets), on the output unit 13 as a candidate for the printer having a possibility of the order of the order information HJ being assigned to the printer.

From the viewpoint of the order quantity, in Exemplary Embodiment 2, the "addition of the stock quantity" is synonymous with the "division of the order quantity" in which "300 sheets" being the order quantity in the order information HJ is divided into, for example, "100 sheets" of the "paper A" of the "manufacturer X" and "200 sheets" of the "paper A" of the "manufacturer Y".

Similar to Exemplary Embodiment 1, in response to the overall list (illustrated in FIGS. 16 to 20) displayed on the output unit 13 in the printing management apparatus PK, the orderer HC selects "Option 1" from the input unit 11 in the printing management apparatus PK, for example. In other words, the CPU 12 in the printing management apparatus PK, as the receiving unit 22, receives the selection of "Option 1". In this case, differing from Exemplary Embodiment 1, the CPU 12 as the communication unit 21 notifies the terminal device TMp1 of the printer PG1 that the printer PG1 is allowed to obtain the order of "300 sheets" in the order information HJ by "100 sheets" of the "paper A" of the "manufacturer X" of the "printer PG1" and "200 sheets" of the "paper A" of the "manufacturer Y" of the "printer PG1".

Supplementary Description of Processors and Programs

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above-described exemplary embodiment, instead of being stored (installed) in advance in the storage media 14, 34, and 54, the programs PR, PRh, and PRp may be provided by being recorded in a recording medium such as a Compact Disc Read Only Memory (CD-ROM), a Digital Versatile Disc Read Only Memory (DVD-ROM), and a Universal Serial Bus (USB) memory or may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing management apparatus comprising:
   a processor configured to
   acquire an order quantity being a quantity of paper required for printing,
   acquire a stock quantity for each attribute of paper, the stock quantity being a quantity of paper having at least one or more attributes in common with attributes of the paper which is required for the printing and is in stock by a printer, and
   when the order quantity is greater than the stock quantity and a sum of at least two stock quantities is equal to or greater than the order quantity, display the printer as a printer capable of accepting an order.

2. The printing management apparatus according to claim 1,
   wherein the attribute includes information regarding a brand or a type of paper, and
   the processor is configured to acquire the stock quantity of the paper having the at least one or more attributes in common with the attributes of the paper required for the printing.

3. The printing management apparatus according to claim 1,
   wherein the processor is configured to include a cost associated with the order for each candidate for the printer in the display.

4. The printing management apparatus according to claim 2,
   wherein the processor is configured to include a cost associated with the order for each candidate for the printer in the display.

5. The printing management apparatus according to claim 3,
   wherein the processor is configured to include, as the cost associated with the order, at least one of a cost of the paper required for the printing, a cost for performing printing on the paper by a candidate for the printer, or a cost for shipping the paper on which the printing has been performed, from the candidate for the printer to an orderer.

6. The printing management apparatus according to claim 1,
   wherein in paper having two types or more of attributes, at least one of a type of the paper or a brand of the paper is common.

7. The printing management apparatus according to claim 1,
   wherein the processor is configured to display a source of moving the stock quantity and a destination of moving the stock quantity when the processor displays a candidate for the printer regarding addition of the stock quantities.

8. The printing management apparatus according to claim 7,
   wherein the processor is configured to display the source of moving the stock quantity and the destination of moving the stock quantity by arrows.

9. A non-transitory computer readable medium storing a printing management program causing a computer to execute a process, the process comprising:
   acquiring an order quantity being a quantity of paper required for printing;
   acquiring a stock quantity for each attribute of paper, the stock quantity being a quantity of paper having at least one or more attributes in common with attributes of the paper which is required for the printing and is in stock by a printer; and
   when the order quantity is greater than the stock quantity and a sum of at least two stock quantities is equal to or greater than the order quantity, displaying the printer as a printer capable of accepting an order.

* * * * *